(No Model.)

G. W. KIRKPATRICK.
GRAIN DRILL.

No. 428,002. Patented May 13, 1890.

Witnesses:

Inventor:
G. W. Kirkpatrick
By P. J. Dodge
Atty.

UNITED STATES PATENT OFFICE.

GEORGE W. KIRKPATRICK, OF MACEDON, NEW YORK.

GRAIN-DRILL.

SPECIFICATION forming part of Letters Patent No. 428,002, dated May 13, 1890.

Application filed February 25, 1890. Serial No. 341,725. (No model.)

*To all whom it may concern:*

Be it known that I, GEORGE W. KIRKPATRICK, of Macedon, in the county of Wayne and State of New York, have invented certain Improvements in Grain-Drills, of which the following is a specification.

My invention has reference to grain drills and seeders, in which a series of drag-bars are used to carry the hoes, and the object is to provide a simple and easily-operated mechanism for depressing, raising, and holding the drag-bars; and to this end it consists in the combination, with the drag-bars and the devices immediately controlling them, of a worm-wheel, worm, and hand-crank, as hereinafter explained.

Figure 1:
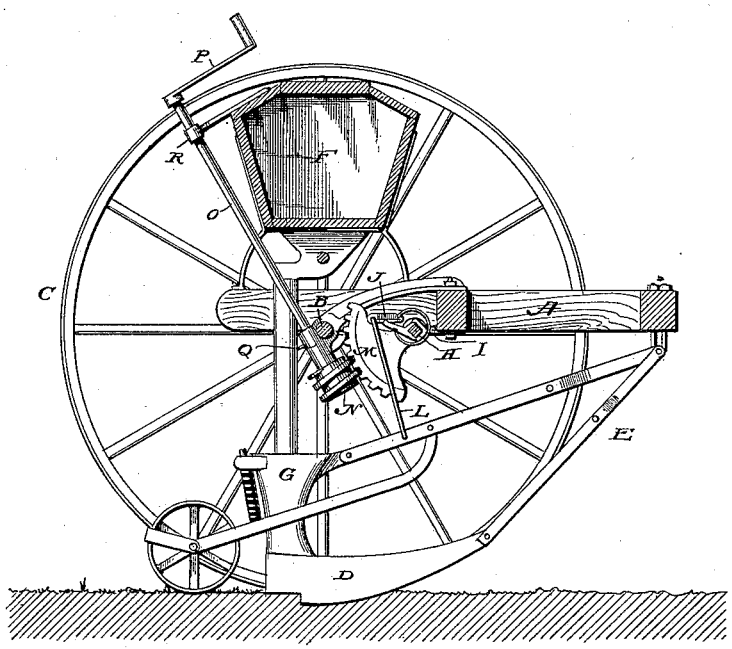
Figure 2:
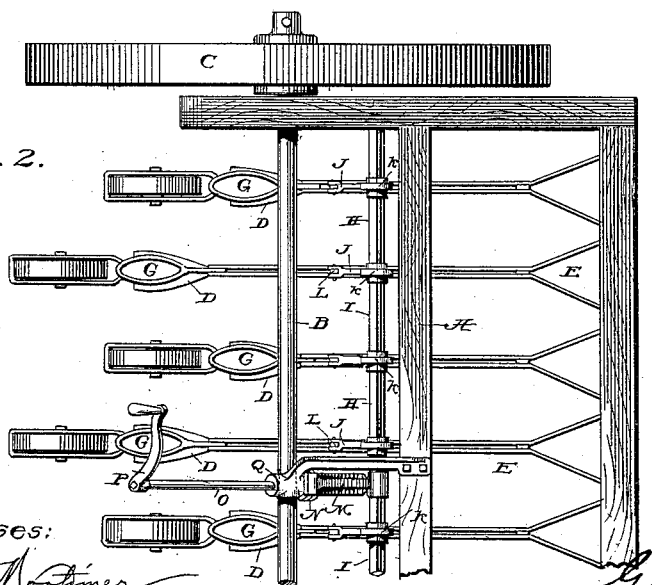

In the accompanying drawings, Figure 1 represents a longitudinal vertical section through a grain-drill containing my improvement. Fig. 2 is a plan view of the leading parts.

Referring to the drawings, A represents the main frame; B, the main axle; C C, the ground-wheels mounted on the ends of the axle; D, one of the series of hoes carried by the drag-bar E, jointed at its forward end to the frame to admit of the hoe rising and falling; F, the seed box or hopper, and G the feeder boots or conductors.

H is a rock-shaft mounted in bearings I and extended across the machine from side to side, and carrying above each drag-bar an arm J, connected to the drag-bar by a link L, so that as the shaft is turned to and fro it will raise and lower the entire series of hoes.

The foregoing parts are of ordinary construction, and being familiar to those skilled in the art they require no further explanation.

M represents a segmental worm-wheel, keyed firmly to the rock-shaft H and engaging a worm N on the end of a shaft O, which is extended upward in rear of the hopper and provided with a hand-crank P, in position to be conveniently operated by the attendant whether riding upon or walking behind the machine. This shaft is sustained at its lower end in a box or bearing Q, the rear end of which encircles the axle, while the forward end is seated on or bolted to the frame. At the upper end the worm-shaft is sustained by an arm R attached to the hopper. By turning the hand-crank the worm is caused to turn the wheel M and the rock-shaft, and thus raise or lower the hoes as required. When the parts are at rest, the worm holds them firmly in the positions to which they are adjusted.

I commonly interpose between the rock-shaft and drag-bars a spring in suitable manner to admit of a yielding pressure being applied to force the hoes, and also to admit of their rising and falling indépendently to a limited extent. This is accomplished, as shown in the drawings, by constructing each arm J of two overlapping parts urged together by the spring *k* which embraces them, but which permits the distal end of the arm to rise and fall independently of the remaining portion when sufficient strain is applied. This spring-arm is not claimed as of my invention, being already known in the art. Instead of the yielding arm a compressible link may be used between the arm and drag-bar, as practiced in existing machines.

The worm and its wheel are very advantageous in my combination, in that they admit of the hoes being strongly depressed or raised in series with great ease and in a positive manner, and also in that they admit of the depth being changed and of the pressure being varied gradually and by imperceptible degrees from one extreme to the other, whereas the levers and notched locking-plates usually employed afford only a limited number of adjustments step by step.

The bearing of the worm and the position of the worm-shaft may be varied, provided the mode of action remains unchanged.

Having thus described my invention, what I claim is—

1. The main frame, the drag-bars and their hoes, the rock-shaft and its arms, and links connecting the arms with the drag-bars, in combination with the worm-wheel on the rock-shaft, the worm, and the worm-shaft provided with a hand-crank.

2. In a grain-drill, the drag-bars, the rock-shaft, and spring-connections between the shaft and the individual bars, in combination with the worm-wheel on the rock-shaft, the worm, and shaft to operate the worm.

3. In a grain-drill, a main frame, drag-bars, and axle, in combination with the rock-shaft, its arms connected with the drag-bars, the worm-wheel on the rock-shaft, the worm, its shaft, and the bearing for said shaft mounted at one end on the axle.

In testimony whereof I hereunto set my hand this 22d day of February, 1890, in the presence of two attesting witnesses.

GEORGE W. KIRKPATRICK.

Witnesses:
W. P. THISTLETHWAITE,
W. L. ACKER.